2 Sheets—Sheet 1.

T. D. McCORMICK.
CORN-HARVESTER.

No. 175,616.                     Patented April 4, 1876.

Witnesses
Henry Orth
D. P. Cowl

Inventor.
Thomas D. McCormick
by Abbott & Co attys.

2 Sheets—Sheet 2.

T. D. McCORMICK.
CORN-HARVESTER.

No. 175,616.  Patented April 4, 1876.

Witnesses  
Henry Orth  
W. E. Chaffee

Inventor  
Thomas D. McCormick  
by Abbott & Co attys.

UNITED STATES PATENT OFFICE.

THOMAS D. McCORMICK, OF MASSILLON, OHIO.

IMPROVEMENT IN CORN-HARVESTERS.

Specification forming part of Letters Patent No. 175,616, dated April 4, 1876; application filed January 21, 1876.

*To all whom it may concern:*

Be it known that I, THOMAS D. MCCORMICK, of Massillon, in the county of Stark and State of Ohio, have invented certain new and useful Improvements in Corn-Harvester; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 2:
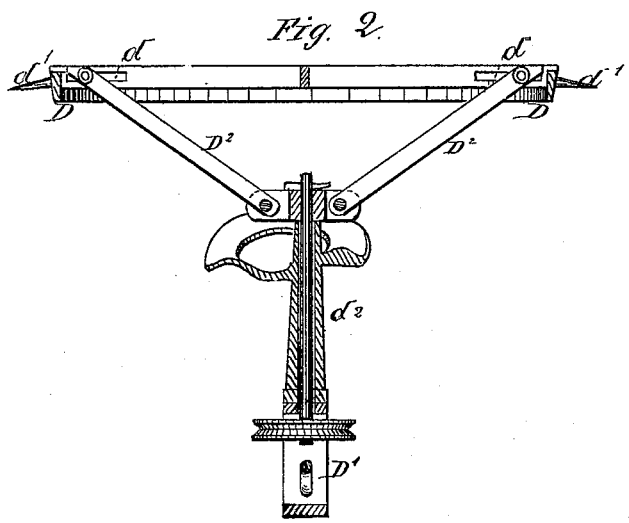
Figure 1:
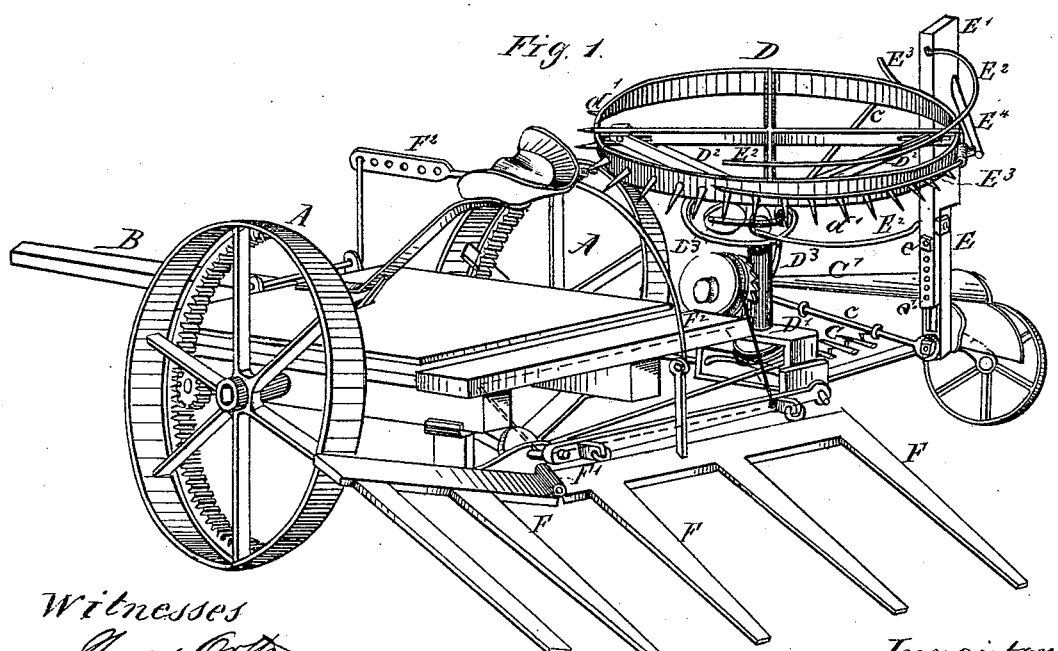
Figure 4:
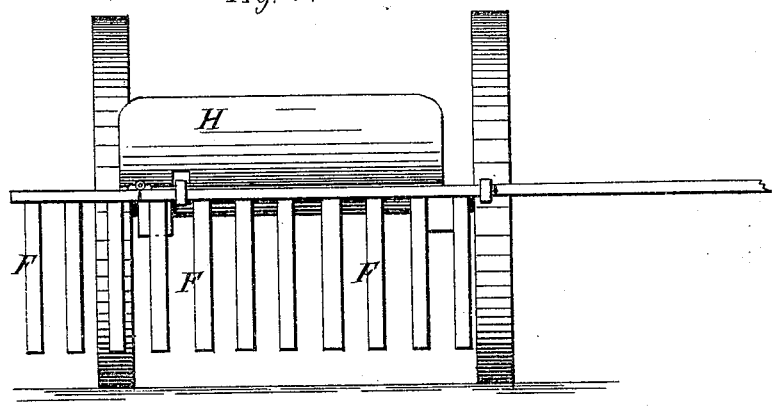
Figure 3:
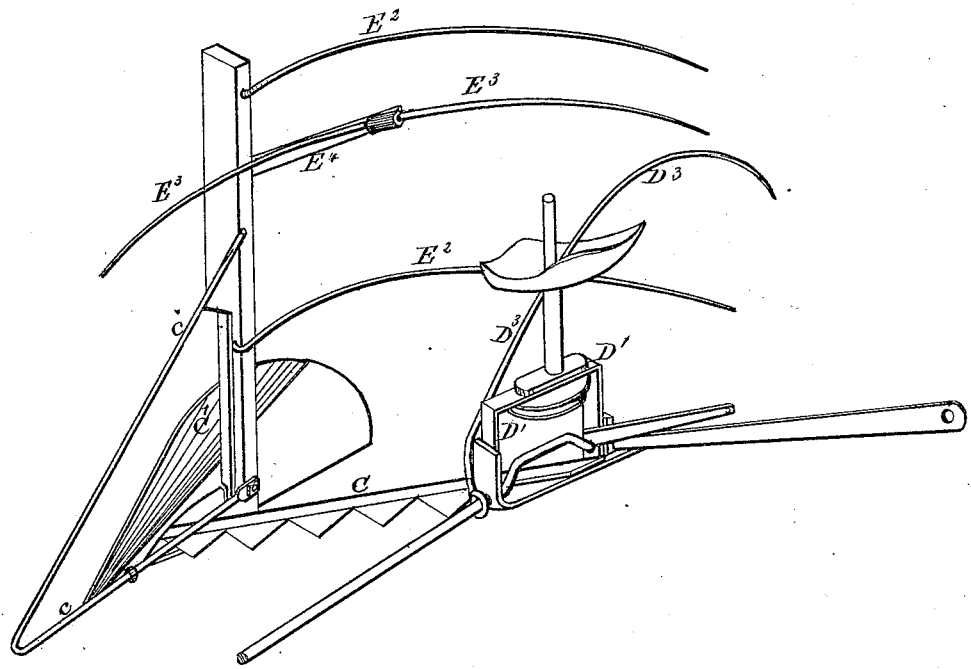

Figure 1 is a perspective view taken from the rear. Fig. 2 is a vertical section of the rake-wheel. Fig. 3 is a detached view, showing more fully the construction and arrangement of the guiding-finger and clearing finger. Fig. 4 is a rear view of so much of a harvester as is necessary to illustrate the position of the guard or shield relative to the dropper.

My invention is more especially adapted to be used upon a two-wheeled rear-cut harvester, and is intended to cut the corn and deliver it upon a dropper, which is arranged in rear of the driving-wheels and main frame.

A A are the main driving and supporting wheels. B is the tongue. The cutting apparatus is represented at C; but as this may be any usual or approved construction, as may be the gearing which drives the same, and the divider-board C', it will not be necessary to give any detailed description of these parts. D is a wheel-rake, supported by and revolving about a rake standard or post, $d^2$, mounted in a rake-stool, $D^1$. The rake-wheel can be adjusted vertically by moving the outer ends of the carrying-arms $D^2$ in the slots $d$ in the spokes of the wheel, the inner ends of these arms being hinged to the rake-head on the upper end of the rake-standard in substantially the same manner as are the ordinary rake-arms or beaters. This stool is mounted, by preference, upon the finger-bar at or near its heel end or hinged end, in order that the wheel-rake may conform to the movement of the cutting apparatus, and always maintain a proper working relation thereto. $d^1$ $d^1$ are gathering spurs or fingers, projecting from the rim of the rake-wheel. These fingers incline downward, as shown in Fig. 2, in order that they shall more readily deliver the cut corn, as will be explained. The outer edge of the rim of the wheel is also beveled to facilitate the discharge of the corn. E is a post, rising from the divider-board C'. $E^1$ is a finger-post, adjustably secured to post E by means of a set-screw or bolt, $e$, which moves in a slot or in holes $e'$ in post E. $E^2$ $E^2$ are circular guiding fingers, attached to finger-post $E^1$, one near the top of the post and one near the bottom, and extending around in rear of the rake-wheel D, and conforming substantially to the path described by the periphery of the wheel in its revolutions. $E^3$ is another guiding-finger, of about the same length as fingers $E^2$, and arranged centrally between them in close proximity to the fingers $d^1$ of the rake-wheel, either above or below this wheel. Finger $E^3$ is mounted upon one end of an elastic arm, $E^4$, which is attached to, and extends rearward from, post $E^1$. When preferred, I may employ four or more of these fingers. $D^3$ is a clearing-finger. This finger is usually attached to the rake-stool $D^1$. When found advisable, however, the clearing-finger may be attached to some other part of the machine, as the inner shoe, or even the drag-bar, or the frame of the machine.

$c$ is a stationary wire finger, attached to the divider-board C'. F F represent the slats of a dropper, hinged in the rear of the main frame. In order to receive and carry corn, which is of much greater length than ordinary grain, I employ a dropper of much greater length than those usually attached to harvesters, and to insure that the machine shall readily pass through a gateway or other contracted passage, I make the dropper in two sections and hinge them together, as at $F^1$, and operate this dropper by the usual tilting-rod $F^2$ and hand or foot lever. H is a guard-plate or fender, supported in an inclined position in front of the hinged ends of the dropper-slats.

Any of the well-known chain, cog-gear, or tumbling-rod connections or devices which are employed for operating the revolving harvester-rakes may be used for imparting a continuous rotary motion to the wheel-rake D; but as many such devices are in common use, both in connection with machines having the cutting apparatus and grain-platform hinged to the main frame, and in machines having a rigid grain-platform, such devices need not be specifically described or referred to, as the rake-wheel and its supporting-stool $D^1$ occupy substantially the same location as do the corresponding parts of the common revolving rake.

As my machine is drawn forward the corn is caught by the gathering-fingers and pressed against the cutting apparatus. After the stalks have been severed by the cutters the continued revolution of the rake-wheel forces the stalks between the periphery of said wheel and the elastic guiding-finger $E^2$ $E^3$, and carries them (the stalks) around to the rear of the main frame, depositing them upon the dropper, the length and curvature of these fingers being such, relative to the rake-wheel and the clearing-finger $D^3$, as to insure that the stalks shall be properly delivered upon the dropper. It will be found that this discharge of the crop upon the dropper in good shape will be much facilitated by the beveled form of the outer side or face of the rim of the wheel, and by making the gathering-fingers $d^1$ with a downward inclination, as their withdrawal from the falling stalks is much more easily effected than it would be if the fingers projected horizontally from the rim of the rake-wheel.

The fender or guard H prevents the stalks from being thrown upon the main frame, or into the gearing, or under the drive-wheels.

By means of the hand or foot lever G the dropper can be tilted, and the accumulated stalks dumped, at the will of the operator.

As the height of the rake-wheel from the cutting apparatus will be partly determined by the kind and condition of the crop to be cut, the desired adjustment can be made by changing the position of the hinged carrying-arms $D^2$ in slots $d$; and, when it is found advisable, a corresponding adjustment in the height of the guiding-fingers $E^2$ $E^3$ may be effected by setting finger-post $E^1$ up or down on post E, and securing it in place by set-screw or bolt $e$.

As it is not practicable to make the divider-board C' vertically adjustable, I usually attach but one finger to it, care being taken that when the rake-wheel is raised or lowered neither the wheel nor its teeth $d^1$ shall strike against the finger or fingers $c$; but I have not been able to dispense with finger or fingers $c$, because it is difficult to make the fingers $E^2$ sufficiently elastic near the point of their attachment to the finger-post $E^1$ to permit the ready passage of the corn at this point, and yet have them press the corn tightly against the rear portion of the wheel In order to provide a suitable elastic support for the upper ends of the stalks as they are engaged by the wheel D, I have added the finger $E^3$, which, being supported centrally by the elastic arm $E^4$, will at all points yield to permit the corn to pass, while at the same time pressing it (the corn) firmly against the rake-wheel while it is being severed.

What I claim is—

1. The combination of the adjustable carrying-arms $D^2$ with the rake-wheel D and standard $d^2$, substantially as set forth.

2. The combination of the finger $E^3$ and arm $E^4$, mounted on post $E^1$, with the rake-wheel D, substantially as set forth.

3. The combination of the fingers $E^2$ $E^3$ and their supporting-post, the finger $c$ attached at the outer end of the cutting apparatus, and the rake-wheel D, substantially as set forth.

4. The dropper, made in two parts hinged together, substantially as set forth.

5. The dropper hinged in rear of the main frame, in combination with a guard or fender, H, which is attached to, and supported by, the main frame.

In testimony that I claim the foregoing as my own I affix my signature in presence of two witnesses.

THOMAS D. McCORMICK.

Witnesses:
P. S. SOWERS,
GEO. W. RAFF.